United States Patent
Kanamori et al.

(10) Patent No.: US 7,508,356 B2
(45) Date of Patent: Mar. 24, 2009

(54) HEAD-UP DISPLAY APPARATUS

(75) Inventors: Naohito Kanamori, Kariya (JP); Yayoi Hatanaka, Kariya (JP)

(73) Assignee: Denso Corporation, Kariya (JP)

( * ) Notice: Subject to any disclaimer, the term of this patent is extended or adjusted under 35 U.S.C. 154(b) by 606 days.

(21) Appl. No.: 11/232,915

(22) Filed: Sep. 23, 2005

(65) Prior Publication Data

US 2006/0071877 A1    Apr. 6, 2006

(30) Foreign Application Priority Data

Oct. 4, 2004   (JP)   ............... 2004-291269

(51) Int. Cl.
*G09G 5/00* (2006.01)
(52) U.S. Cl. ............................. 345/7; 345/8
(58) Field of Classification Search ............ 345/7, 345/8; 359/630, 631, 633
See application file for complete search history.

(56) References Cited

U.S. PATENT DOCUMENTS 6,750,832 B1 *  6/2004  Kleinschmidt ............ 345/7

2004/0150884 A1 *  8/2004  Domjan et al. ............ 359/462

FOREIGN PATENT DOCUMENTS

| JP | A-H07-005886 | 1/1995 |
| JP | A-08-094756 | 4/1996 |
| JP | A-09-086225 | 3/1997 |
| JP | A-09-182113 | 7/1997 |
| JP | A-2004-133181 | 4/2004 |

OTHER PUBLICATIONS

Office Action dated Jun. 12, 2008 in corresponding Japanese Patent Application No. 2004-291269 (and English translation).

* cited by examiner

*Primary Examiner*—Amare Mengistu
*Assistant Examiner*—Premal Patel
(74) *Attorney, Agent, or Firm*—Posz Law Group, PLC

(57) ABSTRACT

A head-up display apparatus includes an image display device for projecting at least two separate images, a mirror for reflecting the images, and an image screen for receiving and displaying the images. Each of the images expansively travels along optical path from the image display device to the image screen on a front windshield of a vehicle. Lengths of the optical paths of the at least two images from the image display device to the image screens are respectively different.

4 Claims, 2 Drawing Sheets

HEAD-UP DISPLAY APPARATUS

CROSS REFERENCE TO RELATED APPLICATION

This application is based on and claims the benefit of priority of Japanese Patent Application No. 2004-291269 filed on Oct. 4, 2004, the disclosure of which is incorporated herein by reference.

FIELD OF THE INVENTION

The present invention generally relates to a head-up display apparatus that displays multiple images on a windshield of a vehicle.

BACKGROUND OF THE INVENTION

In recent years, a head-up display apparatus is used to deliver various information on a vehicle such as a vehicle speed, a navigation information to a destination of a travel or the like. A conventional head-up display uses an image projection device for projecting an image on a windshield, and an image screen for receiving and displaying the image from the image projection device. Japanese Patent Document JP-A-2004-133181 discloses a head-up display apparatus that projects two different images from single image projection device onto two separate screens.

The head-up display apparatus described above uses an image display device and two triangular prisms. The image display device displays two separate images in one image display area. The image display device uses a transparent liquid crystal display (LCD) panel, and a light source for providing a light to the LCD panel. The image display device has an image separation panel for preventing interference of two images in the image display area. The triangular prisms are used to redirect two images on the LCD panel toward two separate optical paths. The triangular prisms are disposed on the image separation panel for respectively guiding each of the two separate images on the LCD.

The two separate image screen of the head-up display apparatus is used for displaying two separate images projected from the triangular prisms. The two image screens are respectively positioned in an instrument panel and on a windshield to display a speed meter and similar instruments. The two image screens display two separate images at the same time.

The head-up display apparatus splits a single frame of an image on the LCD panel into two images, and projects them onto two separate screens. That is, the two images on the LCD panel are respectively projected to the two triangular prisms to be redirected toward the two image screens. The two images pass along the two separate optical paths to be displayed on the two separate image screens respectively in the instrument panel and on the windshield. In this manner, a driver of the vehicle perceives the two separate images respectively in the instrument panel and on the windshield.

The images displayed on the image screen in the head-up display apparatus can be used to display various kinds of information such as vehicle information, navigation information, a night-vision image, and the like. The head-up display apparatus itself contributes to safety of driving operation because it minimizes driver's eye movement for collecting information by displaying the image on the windshield beside delivering various kinds of information.

However, the conventional head-up display apparatus cannot displays two different images on one image screen. That is, a head-up display apparatus that can deliver two different images at the same time on the windshield by using two optical paths has not been disclosed.

In addition, the two different images respectively include contents having different natures, or different characteristics. Therefore, the sizes and the positions of the two images on the windshield has to be differentiated.

SUMMARY OF THE INVENTION

In view of the above-described and other problems, the present invention provides a head-up display apparatus that displays at least two images in respectively different sizes in different positions on a windshield of a vehicle at the same time.

The head-up display apparatus in an embodiment of the present invention includes an image display device for projecting at least two images. Each of the two images travels in an optical path from the image display device to an image screen on a front windshield of a vehicle. The two optical paths of the images take separate routes from the image display device to the image screen. Therefore, the lengths of the two optical paths are different.

The image projected from the image display device is redirected by a plurality of mirrors toward the image screen on the windshield. Another image from the image display device is redirected to another image screen in a different position on the windshield in the same manner. The optical paths of the two images are different because the two optical paths are separately redirected. Therefore, the two images have two different focal lengths. That is, a driver of the vehicle recognize two images being formed at different distances. In this manner, the sizes of the two images can be made different.

According to one aspect of the present invention, the image display device includes an image display portion for displaying a plurality of images in one window, and a plurality of mirrors for redirecting the plurality of images projected from the image display portion. The image screen includes a plurality of screen areas for respectively receiving and displaying the plurality of images. The plurality of the images respectively travel in different optical paths from the image display portion to the image screens. Lengths of the optical paths from the image display portion to the image screens are respectively different. In this manner, the driver of the vehicle perceives the plural images being in different distances to be formed in different sizes.

According to another aspect of the present invention, the image display device displays a first image and a second image in one window, and the first image and the second image are reflectively redirected in different directions along different paths to a first screen and a second screen on the windshield. The paths from the image display device to each of the first and second screens are different in length. In this manner, the driver of the vehicle perceives the first image and the second image being in different distances to have different sizes at the same time.

According to yet another aspect of the present invention, two mirrors for redirecting the images projected from the image display device are disposed in an obtuse angle against a rectangular connecting portion between the two mirrors. That is, the two mirrors form a V shape with the connecting portion interposed therebetween. In this manner, the path of the first image and the path of the second image are made different between the image display device and the image screens on the windshield.

According to still another aspect of the present invention, one mirror in the optical path of the second image has higher magnifying power than the other mirror in corresponding position in the optical path of the first image. In this manner, the size of the second image is perceived larger than the size of the first image by the driver of the vehicle.

According to yet still another aspect of the present invention, the second image travels longer than the first image in terms of the optical path from the image display device to the mirror for redirecting the image toward the screen on the windshield. In this manner, the size of the first image and the size of the second image are made different when the driver perceives the images.

According to yet still another aspect of the present invention, the size of the image perceived by the driver of the vehicle is made different for each of the at least two images by controlling a distance to virtual projection screens for each of the images. That is, the driver of the vehicle perceives the image through the windshield at a virtual distance that is determined by a real distance multiplied by magnifying powers of the mirrors in an image path from the image display device to the screen on the windshield. In this manner, the sizes of the at least two images perceived by the driver are made different.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A head-up display apparatus of the present invention is described with reference to the drawings.

Figure 1:
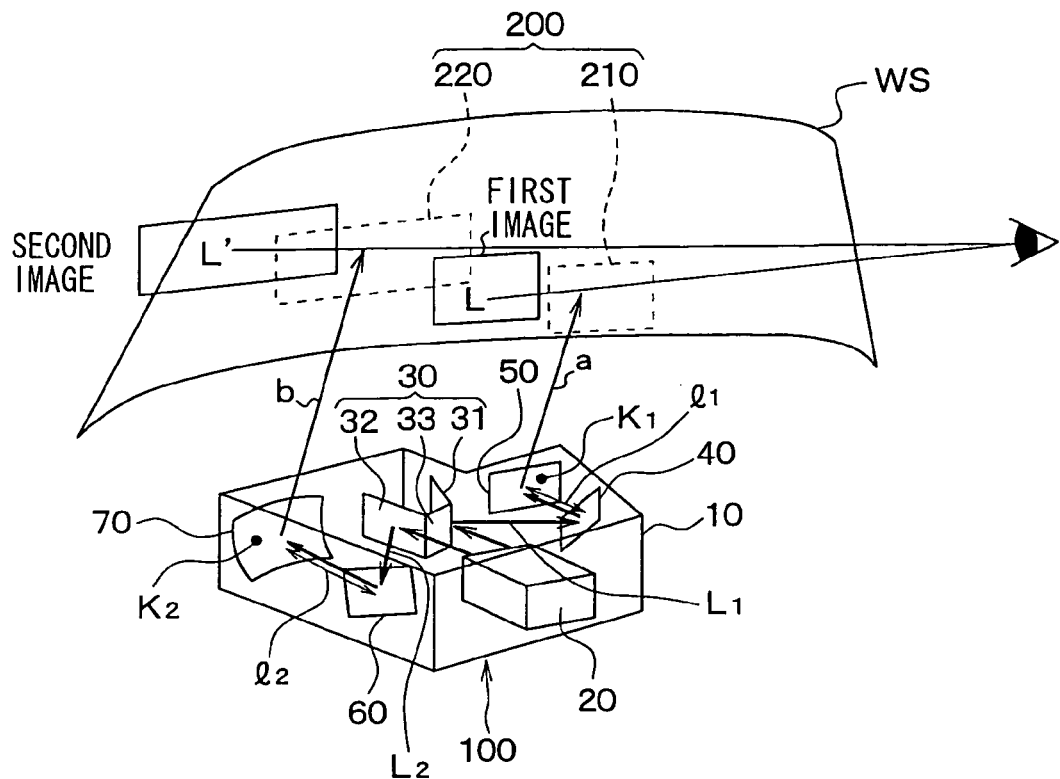
FIG. 1 is a perspective view of a head-up display apparatus in an embodiment of the present invention.

FIG. 1 shows a perspective view of a head-up display apparatus in an embodiment of the present invention.

The head-up display apparatus in FIG. 1 includes an image projection device 100 and an image display portion 200.

The image projection device 100 projects an image for displaying it in the image display portion 200 on a front windshield WS. The image projection device 100 includes a housing 10, a display 20, a reflecting mirror 30, a first plane mirror 40, a second plane mirror 50, a third plane mirror 60, and a concave mirror 70.

The housing 10 forms an outer shape of the image projection device 100. The housing 10 is disposed on a reverse side of an instrument panel of a vehicle with the display 20, the reflecting mirror 30, the first to third plane mirrors 40-60, and the concave mirror 70 included therein.

The display 20 emits a light for displaying the image in the image display portion 200 on the front windshield WS. The display 20 includes a light source, a liquid crystal panel, and a case (not shown in the drawing).

The light source is a well-known type of lighting device for projecting a light toward the liquid crystal panel. The light source is, for example, made by using an LED (Light Emitting Diode).

The liquid crystal panel is formed by two glass plates with an interposing liquid crystal. The liquid crystal between the two glass plates is divided to an array of dots (pixels) by a circuit pattern, and each of the pixels is controlled by a thin film transistor (TFT) for displaying the image. The liquid crystal panel is electrically connected to an external circuit such as an ECU or the like. The image displayed on the liquid crystal panel is controlled by a signal from the ECU or the like.

Figure 2:
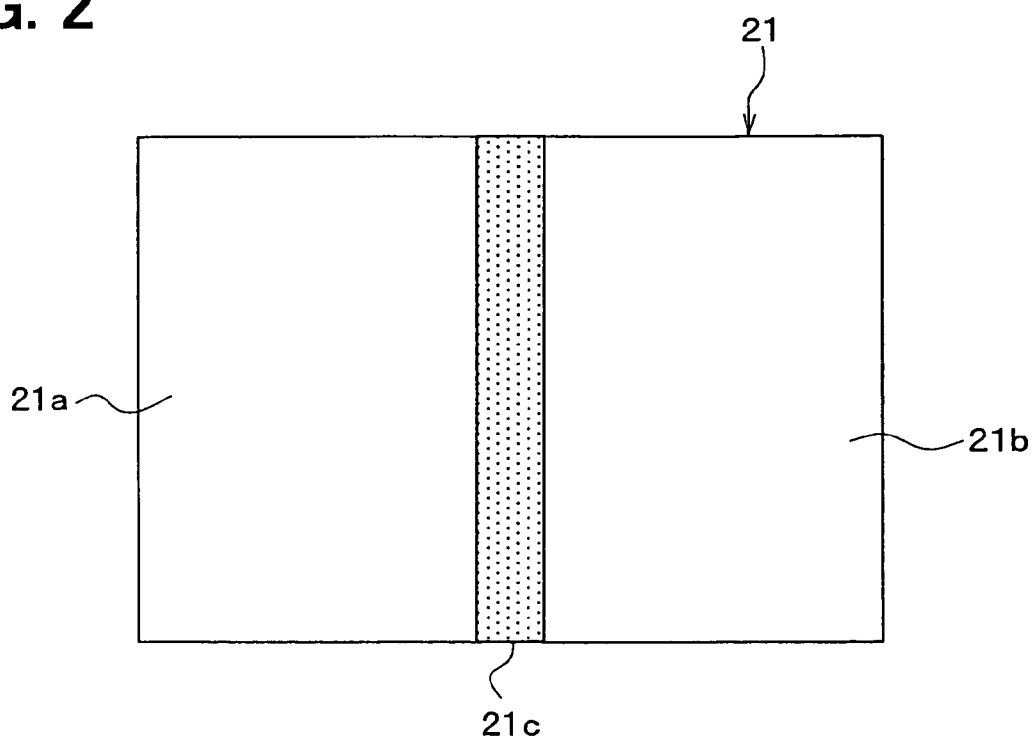
FIG. 2 is an image display portion of a liquid crystal panel in the embodiment.

The liquid crystal panel in the present embodiment displays two different images in a frame in a window. FIG. 2 shows an image display portion of the liquid crystal panel in the present embodiment. A liquid crystal panel 21 is a part of the display 20. The liquid crystal panel 21 displays a first image 21a and a second image 21b at the same time. A dividing portion 21c is disposed between the two images 21a and 21b for separately displaying the image 21a and the image 21b. The dividing portion 21c is, for example, represented by a color black.

The case forms an outer shape of the display 20. The case includes the light source, the liquid crystal panel 21 and the like in an inside space. The case has an opening on one side for enabling projection of the light of the image on the liquid crystal panel.

The display 20 displays the first image 21a and the second image 21b based on an image signal from the external ECU or the like. Each of the two images is projected from the opening of the case upon receiving the light from the light source.

The reflecting mirror 30 reflectively redirects the image projected from the display 20 toward the first and the third plane mirrors. The reflecting mirror 30 includes a first reflecting mirror 31 and a second reflecting mirror 32 with a connecting portion 33 interposed therebetween as shown in FIG. 1. One side of the first reflecting mirror 31 and one side of the connecting portion 33 are joining, and one side of the second reflecting mirror 32 and the other side of the connecting portion 33 are also joining. The first reflecting mirror 31 side of the connecting portion 33 and the second reflecting mirror 32 side of the connecting portion 33 are opposing sides of the connecting portion 33. An angle between the first reflecting mirror 31 and the connecting portion 33 is obtuse, and an angle between the second reflecting mirror 32 and the connecting portion 33 is also obtuse. Therefore, the reflecting mirrors 31 and 32 with the connecting portion 33 substantially form a V shape in a view taken from a ceiling of the vehicle.

The reflecting mirror 30 is disposed in a position where the reflecting mirror 30 faces a light projecting side of the display 20. In this case, the connecting portion 33 of the reflecting mirror 30 is aligned with the dividing portion 21c of the liquid crystal panel 21. In this manner, the first image 21a is projected from the display 20 toward the first reflecting mirror 31 of the reflecting mirror 30, and the second image 21b is projected from the display 20 toward the second reflecting mirror 32 of the reflecting mirror 30.

Further, the first image 21a is reflectively redirected from the first reflecting mirror 31 toward the first plane mirror 40, and the second image 21b is reflectively redirected from the second reflecting mirror 32 toward the third plane mirror 60. That is, the first and second images 21a, 21b are respectively projected in different directions by the V shape reflecting mirror 30 from the liquid crystal panel 21 having the dividing portion 21c. In this manner, the interference between the first and second images 21a and 21b is prevented.

The first to third plane mirrors 40 to 60 reflectively redirect the incoming image. That is, the first plane mirror 40 reflectively redirects the first image 21a from the first reflecting mirror 31 toward the second plane mirror 50. The first plane mirror 40 is disposed on a first image 21a projection side of the display 20.

The second plane mirror 50 is disposed on a front side of the vehicle relative to the first plane mirror 40. The second plane mirror 50 reflectively redirects the first image 21a from the first plane mirror 40 in the housing 10 toward the front windshield WS through the opening (not shown in the drawing) on an upper side of the instrument panel. The first plane mirror 40 is disposed on a first image 21a projection side of the display 20. The second plane mirror 50 in this embodiment reflectively magnifies the size of the image twice as large as the original one.

The third plane mirror 60 reflective redirects the second image 21b from the second reflecting mirror 32 toward the concave mirror 70. The third plane mirror 60 is disposed on a second image 21b projection side of the display 20.

The concave mirror 70 is disposed on a front side of the vehicle relative to the third plane mirror 60. The concave mirror 70 reflectively redirects the second image 21b from the third plane mirror 60 in the housing 10 toward the front windshield WS through the opening (not shown in the drawing) on the upper side of the instrument panel. The concave mirror 70 in this embodiment reflectively magnifies the size of the image five times as large as the original one.

The display portion 200 receives the image projected from the image projection device 100. The display portion 200 is an image display area (a 'combiner') on an inner surface of the front windshield WS. The display portion 200 includes a first screen 210 and a second screen 220.

The first screen 210 is used to receive the first image 21a for display. That is, the first image 21a from the second plane mirror 50 is reflectively formed on the first screen 210. The first image 21a on the first screen 210 displays, for example, navigation information such as an arrow and a route, or vehicle information such as a speed and the like.

The second screen 220 is used to receive the second image 21b for display. The second screen 220 is larger than the first screen 210. That is, the side of the second image 21b is larger than the size of the first image 21a. The second image from the concave mirror 70 is reflectively formed on the second screen 220. The second image 21b on the second screen 220 displays, for example, a night-view image, a silhouette emphasis image or the like.

The front windshield WS is formed in a curve shape thereby magnifying a reflectively redirected image on its inner surface. The magnifying power of the front windshield WS is, for example, 1.3 to 1.5 times.

Figure 3:
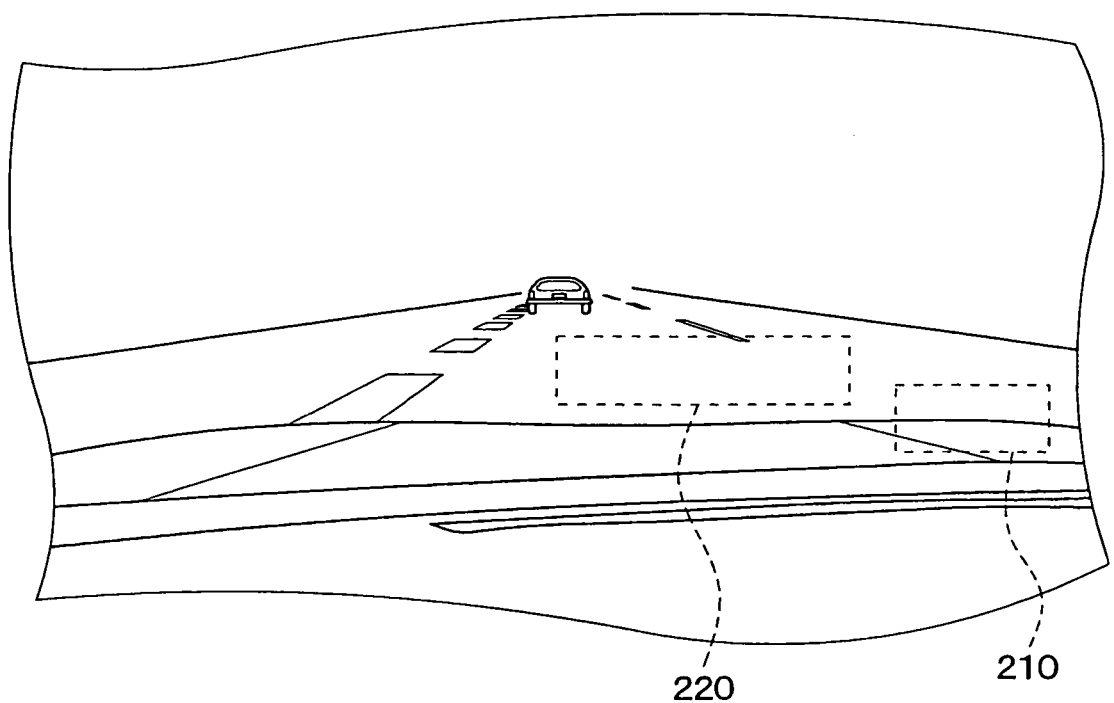
FIG. 3 is an illustrative view of a front windshield taken from a driver's seat in the embodiment.

FIG. 3 is an illustrative view of a front windshield taken from a driver's seat in the present embodiment. The first and second screens 210 and 220 are disposed in a lower side of the front windshield WS.

Next, the sizes of the first image 21a and the second image 21b perceived as virtual images by the driver of the vehicle are explained. The sizes of the first and the second images 21a, 21b are proportional to the distance measured from the driver of the vehicle (perceiver) to the virtual images as shown in FIG. 1, because of the rectilinear propagation of the light. That is, the size of an image becomes twice as large as the original one when the distance from the perceiver to the image becomes twice as far as the original distance. This relationship can also be explained as a relationship between the base and the height of a triangle in geometry. In this case, the size of the image corresponds to the length of the base, and the distance to the image corresponds to the height.

The first image 21a perceived as a virtual image on the first screen 210 is represented by L in the formula 1 in the following, when the length of an optical path from the display 20 to the second plane mirror 50 is $L_1$ (80 mm), the magnifying power of the second plane mirror 50 is $K_1$ (2), the length of the optical path from the second plane mirror 50 to the front windshield WS is a (200 mm), and the magnifying power of the front windshield WS is Kws (1.5).

$$L=Kws(a+K_1L_1)=1.5\times(200+2\times80)=660 \text{ (mm)} \quad \text{[Formula 1]}$$

The second image 21b perceived as a virtual image on the second screen 220 is represented by L' in the formula 2 in the following, when the length of an optical path from the display 20 to the concave mirror 70 is $L_2$ (150 mm), the magnifying power of the concave mirror 70 is $K_2$ (5), the length of the optical path from the concave mirror 70 to the front windshield WS is b (250 mm), and the magnifying power of the front windshield WS is Kws (1.5).

$$L'=Kws(b+K_2L_2)=1.5\times(250+5\times150)=1500 \text{ (mm)} \quad \text{[Formula 2]}$$

In this manner, the lengths from the driver of the vehicle to the virtual images of the first and second images 21a and 21b are calculated.

In this case, ratio of the distance L from the driver to the first image 21a and the distance L' from the driver to the second image 21b is about 2.3 based on the calculation in the above. That is, the size of the second image 21b that is reflectively perceived virtually on the second screen 220 by the driver is about 2.3 times greater than the size of the first image 21a that is reflectively perceived virtually on the first screen 210 by the driver.

In the present embodiment, difference between the optical path from the display 20 to the second plane mirror 50 and the optical path from the display 20 to the concave mirror 70, and difference of the magnifying powers between the second plane mirror 50 and the concave mirror 70 contributes to the difference of the distances L and L' to the virtual images of the first and the second images 21a and 21b.

Therefore, the sizes of the first image 21a in the first screen 210 and the second image 21b in the second screen 220 on the front windshield WS can be differentiated.

The difference of the sizes of the first and the second images 21a, 21b may be contributed to the difference between the optical path of the first image 21a from the first plane mirror 40 to the second plane mirror 50 and the optical path of the second image 21b from the third plane mirror 60 to the concave mirror 70.

In this manner, the sizes of the first and the second images 21a, 21b are differentiated by routing the images in respectively different routes, i.e., respectively different optical paths, in the image projection device 100.

Although the present invention has been fully described in connection with the preferred embodiment thereof with reference to the accompanying drawings, it is to be noted that various changes and modifications will become apparent to those skilled in the art.

For example, the dividing portion 21c between the images 21a and 21b may be omitted. The dividing portion 21c may be substituted by two windows for respectively projecting the first image 21a and the second image 21b. In this case, the connecting portion 33 of the reflecting mirror 30 is aligned with the boundary portion of the two windows.

In this manner, the interference of the two images displayed in one frame of the liquid crystal panel 21 in the optical paths from the display 20 toward the image screen is prevented.

Further, the connecting portion 33 of the reflecting mirror 30 may be omitted. That is, the first reflecting mirror 31 and the second reflecting mirror 32 may be directly connected without using the connecting portion 33 interposed therebetween.

Furthermore, the second plane mirror 50 for reflectively redirecting the first image 21a may be replaced with a concave mirror. In this manner, the size of the first image on the front windshield WS becomes larger.

Figure 4:
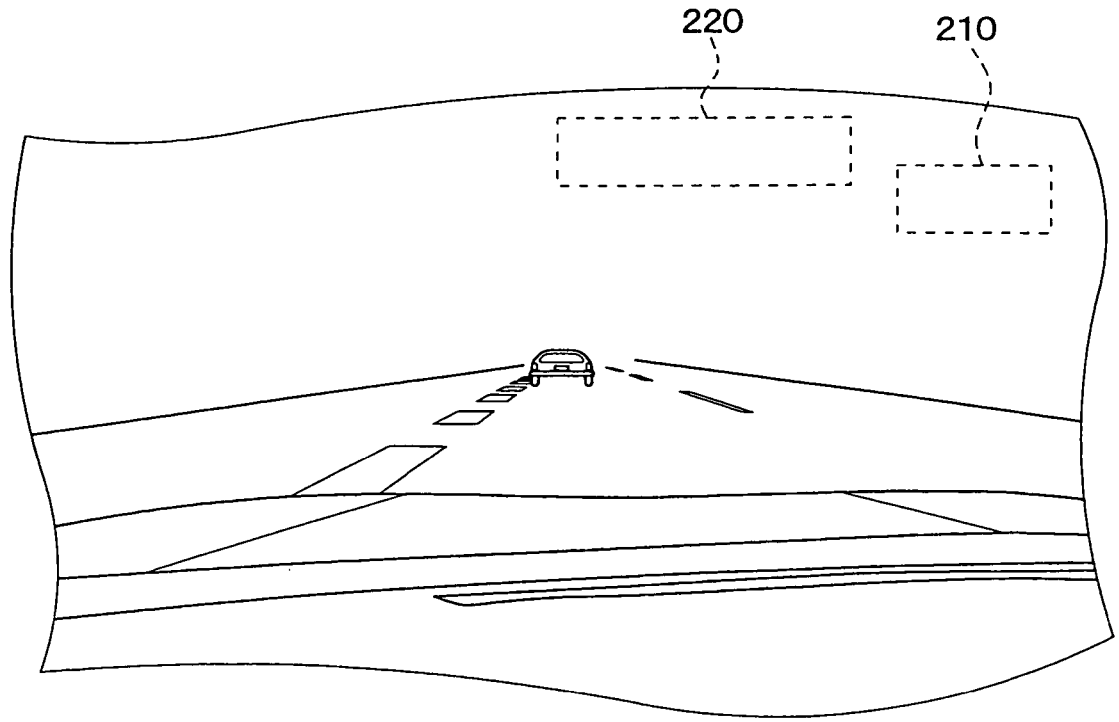
FIG. 4 is another illustrative view of the front windshield taken from the driver's seat in the embodiment.

Furthermore, the first and the second screen 210, 220 of the image display portion 200 may be disposed on an upper side of the front windshield WS. FIG. 4 shows an illustrative view of the front windshield having the screens 210 and 220 on the upper side (a ceiling side). This arrangement may be achieved by manually or automatically adjusting disposition angles of the second plane mirror 50 and the concave mirror 70.

Furthermore, the screens 210 and 220 may be disposed on the upper side and the lower side of the front windshield WS. That is, the screen 210 may be on the upper side of the front windshield WS and the screen 220 may be on the lower side, or vice versa.

Furthermore, one of the screens 210 and 220 may only be used to display the image. In this case, one of the images 21a and 21b in the liquid crystal panel 21 may be represented as a black image. This may be achieved, for example, upon receiving an instruction from the driver of the vehicle through an operation of an operation panel. In this manner, only one of the two screens 210 and 220 on the front windshield WS may display the image.

Furthermore, the first image 21a or the second image 21b may includes a plurality of the images. That is, the first image 21a may, for example, includes plural images in an area of display on the liquid crystal panel 21. The second image 21b may as well include plural images in the area of display on the liquid crystal panel 21 as the first image 21a.

Such changes and modifications are to be understood as being within the scope of the present invention as defined by the appended claims.

What is claimed is:

1. A head-up display apparatus disposed in a space adjacent to an instrument panel on a vehicle comprising:
    a display device for projecting an image; and
    a first image screen for receiving and displaying the image;
    a second image screen for receiving and displaying the image;
    wherein the display device includes:
        an image display portion for displaying a first image and a second image in one window;
        a first reflecting mirror for reflectively redirecting the first image at an opposing position of the image display portion,
        a second reflecting mirror for reflectively redirecting the second image at an opposing position of the image display portion;
        a first relay mirror and a second relay mirror for reflectively redirecting the first image from the first reflecting mirror to the first image screen; and
        a third relay mirror and a fourth relay mirror for reflectively redirecting the second image from the second reflecting mirror to the second image screen,
    wherein the first image travels from the image display portion to the first image screen in a first optical path,
    wherein the second image travels from the image display portion to the second image screen in a second optical path,
    wherein the first optical path and the second optical path are different in lengths
    wherein second optical path is longer than the first optical path,
    wherein the image received and displayed on the image screen is perceived by an occupant of a driver's seat as the image being projected on a virtual plane at a distance from a driver's seat,
    wherein the first image is perceive at a first distance L from the driver's seat,
    wherein the second image is perceive at a second distance L' from the driver's seat, and
    wherein the second distance is greater than the first distance.

2. The head-up display apparatus of claim 1,
    wherein the first reflecting mirror and the second reflecting mirror are connected by a connecting portion, and
    both of an angle between the first reflecting mirror and the connecting portion and an angle between the second reflecting mirror and the connecting portion are obtuse.

3. The head-up display apparatus of claim 1,
    wherein the fourth relay mirror has a greater magnifying power than the second relay mirror.

4. The head-up display apparatus of claim 1,
    wherein the first distance L and the second distance L' are respectively represented by following two equations, $$L = Kws(a + K_1 L_1)$$

$$L' = Kws(b + K_2 L_2)$$

where Kws is a magnifying power of the windshield,
    $L_1$ is a length of the first optical path from the image display portion to the second relay mirror,
    $K_1$ is a magnifying power of the second relay mirror,
    $L_2$ is a length of the second optical path from the image display portion to the fourth relay mirror,
    $K_2$ is a magnifying power of the fourth relay mirror,
    a is a distance from the second relay mirror to the windshield, and
    b is a distance from the fourth relay mirror to the windshield.

* * * * *